United States Patent
Fujibayashi et al.

(10) Patent No.: US 6,925,532 B2
(45) Date of Patent: *Aug. 2, 2005

(54) BROADCAST SYSTEM IN DISK ARRAY CONTROLLER

(75) Inventors: Akira Fujibayashi, Kokubunji (JP); Atsushi Tanaka, Urawa (JP); Nobuyuki Minowa, Odawara (JP); Hikari Mikami, Odawara (JP); Hisashi Nanao, Fujisawa (JP)

(73) Assignees: Hitachi, Ltd., Tokyo (JP); Hitachi Software Engineering Company, Ltd., Yokohama (JP); Hitachi Video and Information System Inc., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/674,535

(22) Filed: Oct. 1, 2003

(65) Prior Publication Data

US 2004/0064637 A1 Apr. 1, 2004

Related U.S. Application Data

(63) Continuation of application No. 10/098,519, filed on Mar. 18, 2002, now Pat. No. 6,658,529, which is a continuation of application No. 09/524,270, filed on Mar. 13, 2000, now Pat. No. 6,564,294.

(30) Foreign Application Priority Data

Mar. 17, 1999 (JP) .......................................... 11-071401

(51) Int. Cl.[7] .............................................. G06F 12/00
(52) U.S. Cl. ........................ 711/114; 711/147; 711/148; 710/8; 709/213
(58) Field of Search .......................... 709/213; 710/8; 711/114, 147, 148

(56) References Cited

U.S. PATENT DOCUMENTS

| | | | |
|---|---|---|---|
| 4,410,944 A | 10/1983 | Kronies | 711/147 |
| 5,537,533 A | 7/1996 | Stahel et al. | 714/5 |
| 6,101,497 A | 8/2000 | Ofek | 707/10 |
| 6,216,179 B1 | 4/2001 | Murata et al. | 710/8 |
| 6,230,240 B1 | 5/2001 | Shrader et al. | 711/114 |
| 6,260,124 B1 | 7/2001 | Crockett et al. | 711/162 |
| 6,564,294 B1 | 5/2003 | Fujibayashi et al. | |
| 6,658,529 B2 * | 12/2003 | Fujibayashi et al. | 711/114 |

FOREIGN PATENT DOCUMENTS

| | | |
|---|---|---|
| EP | 0444376 | 2/1990 |
| JP | 5816362 | 1/1983 |
| JP | 6145647 | 5/1994 |

* cited by examiner

Primary Examiner—Mano Padmanabhan
Assistant Examiner—Mehdi Namazi
(74) Attorney, Agent, or Firm—Mattingly, Stanger, Malur & Brundidge, P.C.

(57) ABSTRACT

A disk array controller connected in a star configuration with a plurality of interfaces each having a processor, a shared memory connected to the interfaces by access paths and a common bus connected to the interfaces. The shared memory transmits interruption signals to the interface by way of control signals when one of the processors writes broadcast data into the shared memory.

11 Claims, 13 Drawing Sheets

BROADCAST SYSTEM IN DISK ARRAY CONTROLLER

The present application is a continuation of application Ser. No. 10/098,519, filed Mar. 18, 2002 now U.S. Pat. No. 6,658,529; which is a continuation of application Ser. No. 09/524,270, filed Mar. 13, 2000, now U.S. Pat. No. 6,564,294, the contents of which are incorporated herein by reference.

BACKGROUND OF THE INVENTION

This invention relates to a disk array controller utilizing a shared memory type multiprocessor system, and the invention relates in particular to technology for broadcasting of information shared between processors.

A disk array controller utilizing a shared memory type multiprocessor system has a structure as shown in FIG. 3. The controller shown in FIG. 3 is comprised of a plurality of CPU-PK (packages) 301, a shared memory package (SM-PK) #A 303 holding shared memories for storing control information, and a shared memory package (SM-PK) #B 304, all connected by a shared memory bus 302. Each CPU-PK (package) is connected to either a host computer or a disk device. Each CPU-PK (package) has a plurality of CPUs, and each CPU performs data transmission from the disk device or the host computer, or controls data transmission to the disk device or the host computer utilizing control information stored in the memory. In this way, when each CPU is connected on a common bus, the information from each CPU is routed along the common bus so that information from a particular CPU is sent to all the other CPUs and broadcasting can easily be performed.

Though not related to a disk array controller, Japanese Published Unexamined Patent Application No. 61-45647 discloses a multibroadcast system connected to a common bus for broadcasting.

SUMMARY OF THE INVENTION

In the disk array controller using a common bus system as shown in FIG. 3, access requests from CPUs inside a CPU-PK (package) are concentrated in one shared memory bus so that, when additional CPU-PK (packages) are connected to the shared memory bus, bottlenecks occur in data transfer along the common bus, and improved access to the shared memory becomes difficult.

Further, when use of high performance CPUs is attempted in the CPU-PK (package), the data transfer capacity of the common bus becomes a bottleneck versus the performance of these processors, and matching the performance of these processors becomes difficult.

However, the problem of the shared memory method can be resolved by connecting access paths in a one to one ratio between the shared memory and the CPUs inside the CPU-PK (package) and providing a disk array controller with an access path structure utilizing a star connection.

The star connection method, however, has nothing equivalent to the common bus for allowing information to flow from each CPU so that, just as with the common bus method, broadcasting cannot be easily performed. This invention therefore has the object of providing a disk array controller with a star connection between a plurality of processors and a shared memory, and which is capable of broadcasting.

In order to achieve the above objects, the disk array controller of this invention has a plurality of processors to control the interface with the disk device or the host device, and along with a star connection and shared memory to store the control information, utilizes one of the following five methods.

Firstly, a method wherein a structure has common broadcast dedicated buses between processors;

Secondly, a method wherein a register is provided to store broadcast data in the shared memory controller, and each processor reads the register data by means of a broadcast interruption signal output from the shared memory controller.

Thirdly, a method wherein a register is provided to store broadcast data in the shared memory controller, and the broadcast data is written by the shared memory controller in a broadcast register provided in the shared memory access I/F controller of each processor.

Fourthly, a method wherein switch mechanisms are connected between the access I/F from each processor within the shared memory controller or within the shared memory package (hereafter called PK), the switch mechanisms maintain a one-to-many connection, and data is written in a broadcast register within the shared memory I/F controller of each processor.

Fifthly, a method wherein a register is provided to store broadcast data in the shared memory controller, and data written by a processor in a register is read by register polling by other processors.

DETAILED DESCRIPTION OF THE PREFERRED EMBODIMENTS

Various embodiments of the invention will be described with reference to the drawings.

Figure 1:
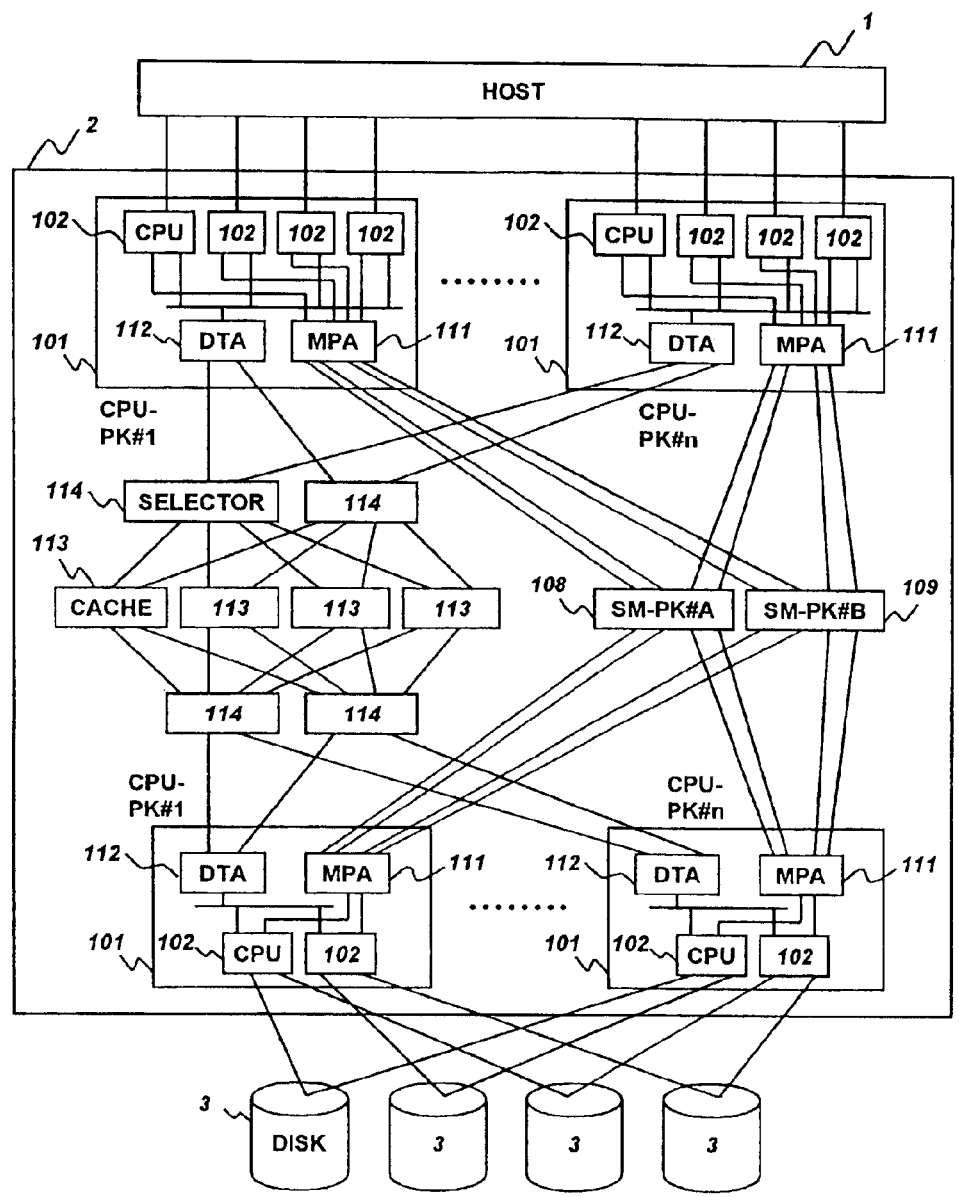
FIG. 1 is block diagram of one embodiment of the disk array controller of this invention.

The overall structure of a disk array controller is shown in FIG. 1. A controller 2 of this embodiment is comprised of a CPU-PK#L through CPU-PK#N (101) connected to a host computer, and a CPU-PK#L through CPU-PK#N (101) connected with a plurality of magnetic disks. The CPU-PK#L through CPU-PK#N (101) connected to the host computer, and the CPU-PK#L through CPU-PK#N (101) connected with a plurality of magnetic disks, are connected with a plurality of cache memories 113, SM-PK#A108 and SM-PK#B109 by a plurality of access paths, but are connected with a cache memory 113 by way of a selector 114. Here, the cache memory 113 is comprised of a memory package or one LSI chip, etc. Each CPU-PK has a plurality of CPUs 102 to control the I/F connection to the host 1 or the I/F connected to a magnetic disk 220, a shared memory path I/F controller (MPA) 111 controlling the access paths to the SM-PK#A108 and SM-PK#B109, and a cache memory path I/F controller (DTA) 112 for controlling the access paths to the cache memory package 113. Data from the host (device) is stored in the cache memory 113, and control information is stored in the shared memory inside the SM-PK#A and SM-PK#B. Here the designation I/F denotes an interface.

Large quantities of data must be transferred at high speed between the DTA112 and the cache 113 so that increasing the number of access paths between the DTA112 and the cache 113 is necessary. A one-to-one connection between the DTA112 and the cache 113 is ideal. However, there is a physical limit to the number of connectors that can be mounted on the package comprising the cache 113 or on the number of pins that can be mounted on the LSI comprising the cache 113 so that the number of access paths that can be added between the DTA112 and the cache 113 is limited. The number of access paths between the DTA112 and the selector 114 can however be increased by installing a selector 114 between the DTA112 and the cache 113 and by connecting the DTA112 and the selector 114 in a one-to-one connection. By restricting the access path requests from a plurality of DTA112 to a specified number with the selector 114, the number of access paths between the caches 113 and the selector 114 can be reduced to a number smaller than the access paths between the DTA112 and the cache 113 to thus eliminate the above mentioned problem of a limited number of connectors or pins.

The shared memory, on the other hand, does not require the transfer of large data in as large amounts as the cache memory 113, however the number of transactions must be increased and the response time required for one data transfer must be shortened. The SMA-PK and the CPU-PK were therefore connected without using a selector, in order to avoid delays from occurring at the selector.

A selector may however be installed between the MPA and the SM-PK. As will be clearly shown in the following explanation, the subsequently described broadcast method is still applicable even if a selector is installed between the MPA and SM-PK.

Figure 2:
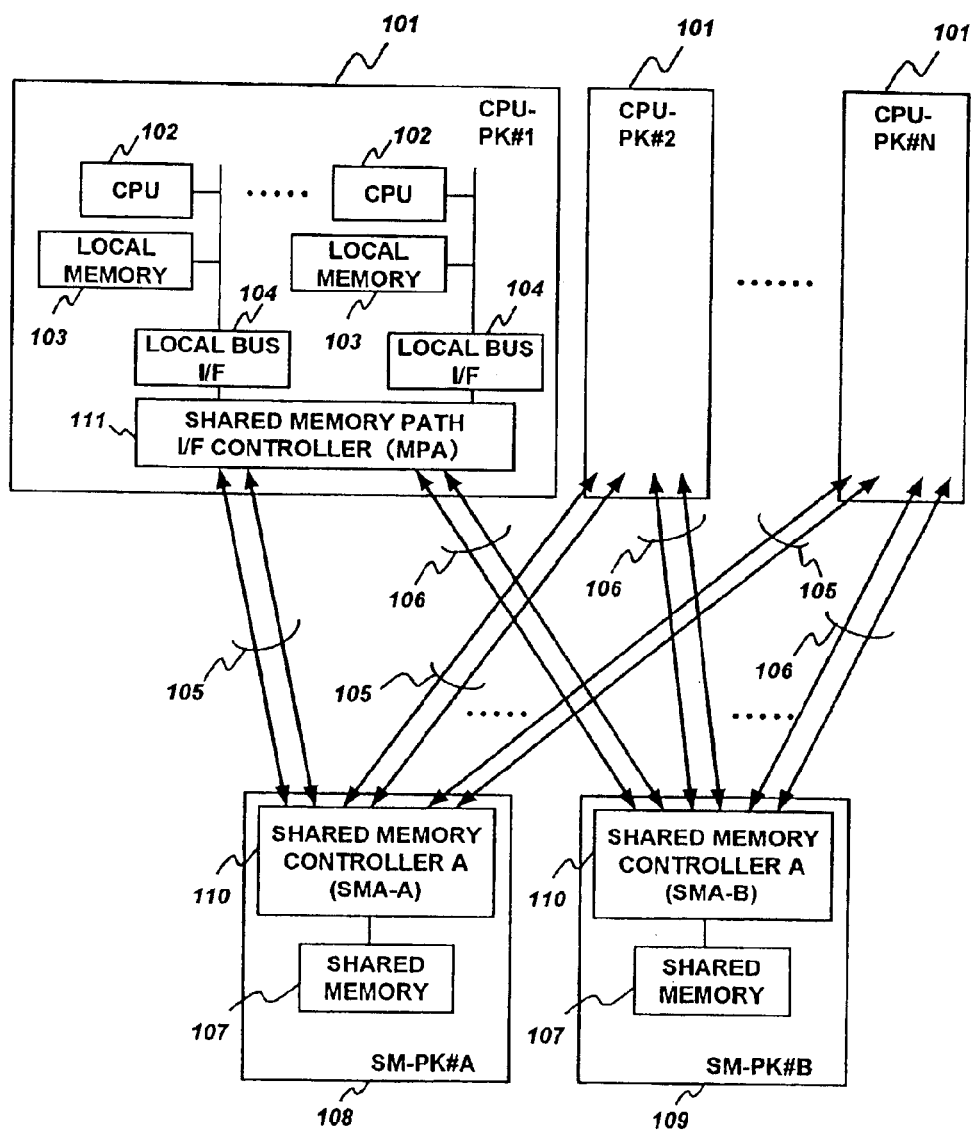
FIG. 2 is block diagram of one embodiment of the disk array controller of this invention.

FIG. 2, besides utilizing the CPU-PK101 and the SM-PK#A108 and SM-PL#B109 of FIG. 1, also shows the structure of the CPU-PK101 in more detail. The CPU-PK101 may be the CPU-PK connected to the host 1 or may be the CPU-PK connected to the magnetic disk 3.

In each CPU-PK101, the plurality of CPUs 102 and each local memory 103 corresponding to each CPU102 are connected to a local bus I/F104. Each local bus I/F104 is connected to the MPA111. The DTA112 is omitted.

Each CPU-PK101 is connected to the SMA-PK#A108 and SMA-PK#B109 by a plurality of common memory busses 105, 106 (total of 4 buses in this embodiment). The SMA-PK#A108 and SMA-PK#B109 have the same structure and respectively contain a shared memory controller A (SMA-A) and a shared memory controller B (SMA-B) 110, and shared memory 107.

Next, how broadcast is accomplished in the disk array controller with the architecture described in FIG. 1 and FIG. 2 will be described.

(First Method)

Figure 4:
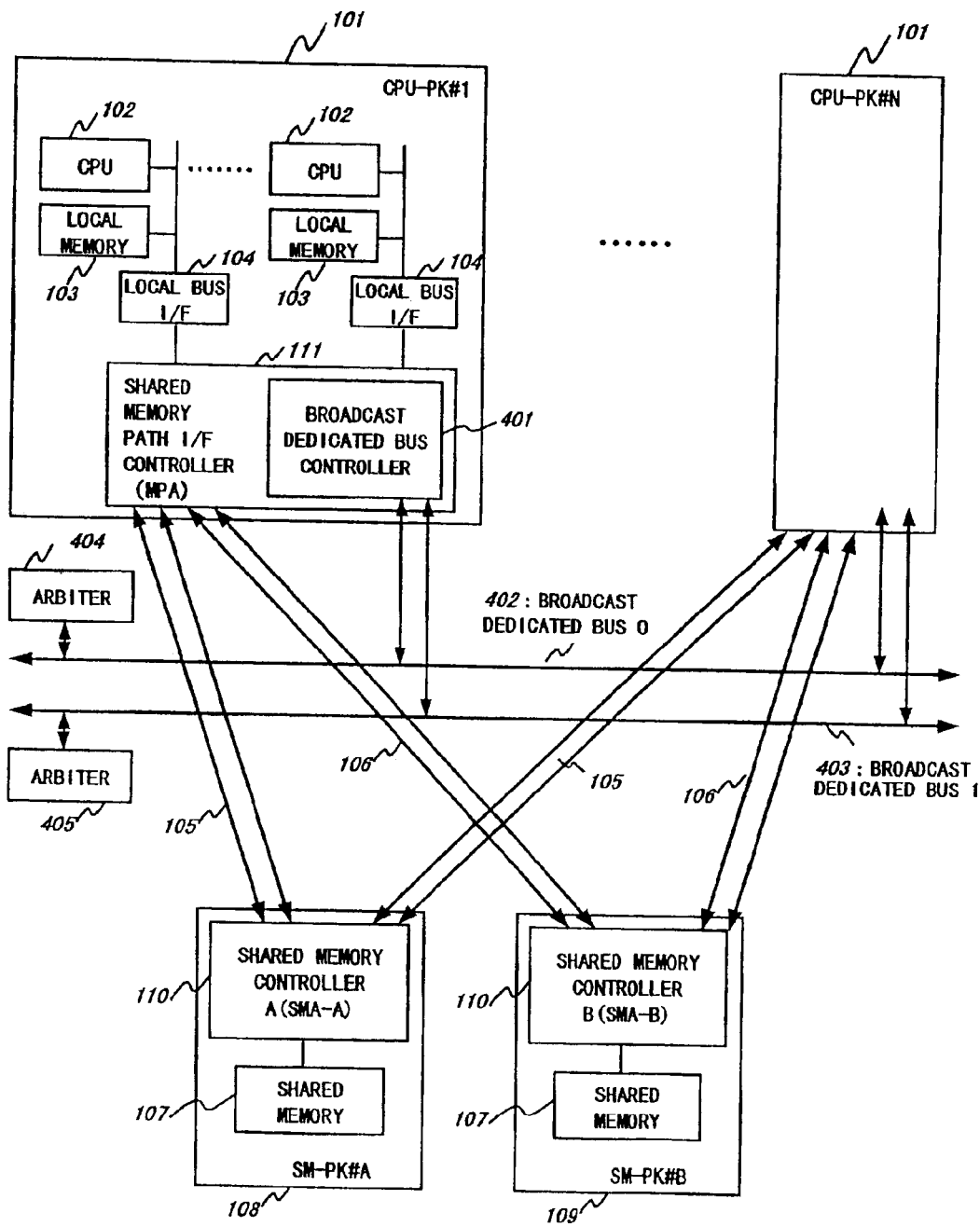
FIG. 4 is a block diagram illustrating the first broadcast method of this invention.

The first method will be described with reference to FIG. 4.

The first method is mainly characterized by the provision of a broadcast dedicated bus. A broadcast dedicated bus controller 401 is installed inside the MPA11 in each CPU-PK101. This broadcast dedicated bus controller 401 is connected between a broadcast dedicated bus 0 (402) and the broadcast dedicated bus 1 (403). When a CPU102 is broadcasting to another CPU102, a broadcast request signal is sent to the broadcast dedicated bus controller 401. In order to acquire rights to use the broadcast dedicated bus, the broadcast dedicated bus controller 401 that received the broadcast request signal, sends a request for broadcast dedicated bus usage rights to an arbiter 404 or 405. The arbiters 404 or 405 carry out mediation processing when faced with competing requests from broadcast dedicated bus controllers 401 from another CPU-PK. The broadcast dedicated bus controller 401 that was assigned usage rights from the arbiters 404 or 405, sends broadcast data sent from a CPU102, along the broadcast dedicated bus. The broadcast dedicated bus controllers 401, in each CPU-PK other than the CPU-PK that sent the broadcast data, are constantly monitoring the broadcast dedicated bus, and when the transmission of broadcast data on the broadcast dedicated bus is detected, that broadcast data is received and sent to each CPU102 inside the same CPU-PK. The method for transmission of broadcast data to a CPU102 includes a method for transmitting an interruption signal to the CPU102, storing the broadcast data in a register, and a method (polling) for allowing each CPU102 to view the contents of that register.

Figure 3:
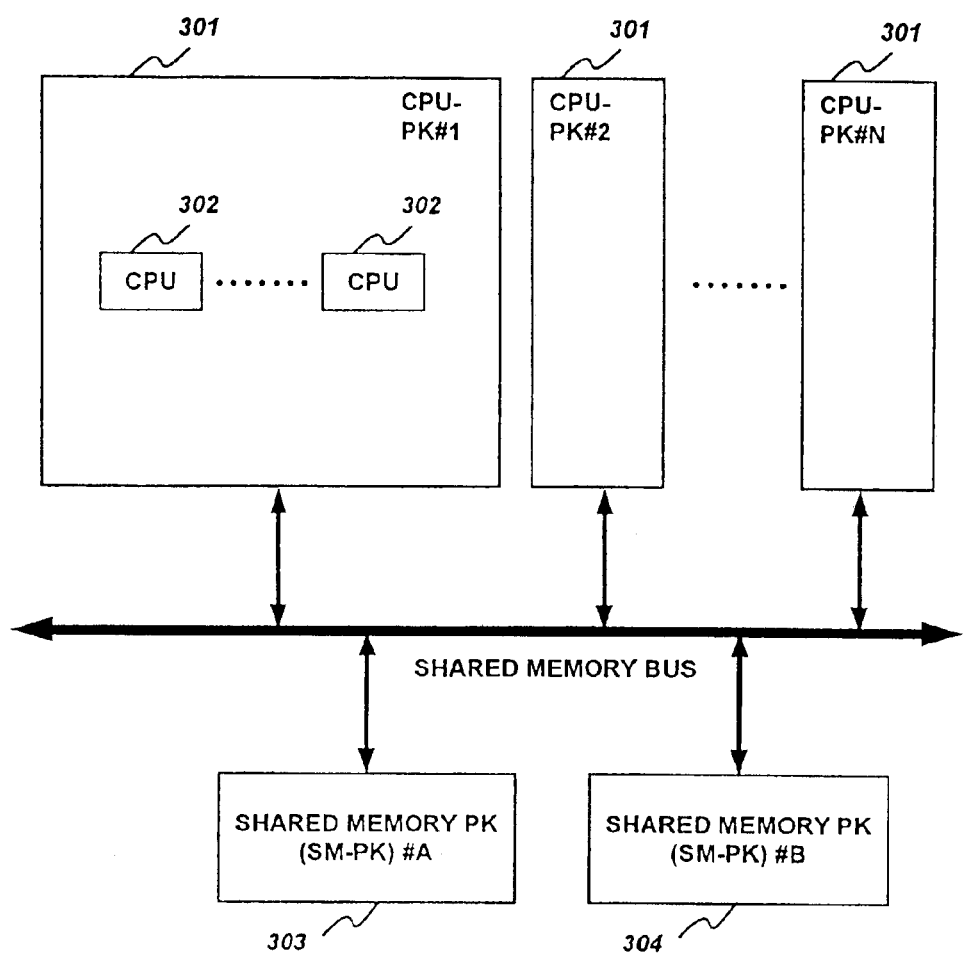
FIG. 3 is block diagram showing a disk array controller using the shared memory bus method of the prior art.

The broadcast dedicated bus does not have to transfer large amounts of data as was required in the shared memory bus of the prior art described with reference to FIG. 3. Therefore, there is no need for a large throughput as in the common bus of the prior art. Data transmission can be achieved with the minimum required number of signal lines.

Moreover, a broadcast dedicated bus memory controller 401 is installed inside the MPA111 in this embodiment;

however, installation inside an MPA111 is not necessarily required. When the broadcast dedicated bus control 401 is installed outside the MPA111, however, then a local bus I/F104 must also be connected to the broadcast dedicated bus control 401.

The second through fifth methods described next have a common feature in that broadcast data is at one point sent to a shared memory controller or shared memory PK in a common section of the processor inside the controller and in this way, is broadcast to the processors. Further, in whatever method, the exchange of broadcast data between the processor and the shared memory I/F controller is performed by a method utilizing an interruption signal or a method using register polling.

(Second-Method)

Figure 5:
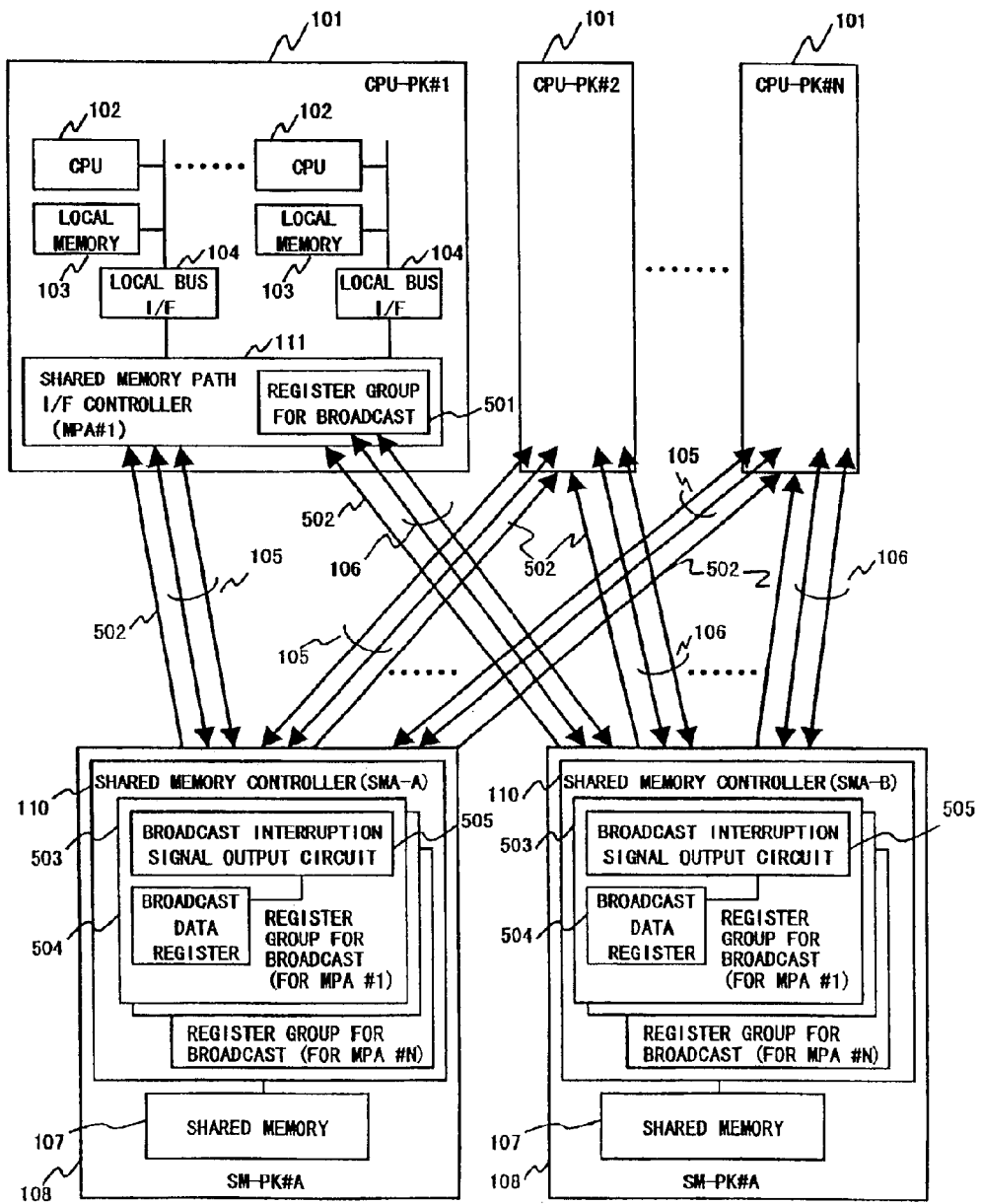
FIG. 5 is a block diagram illustrating the second broadcast method of this invention.

The second method will be described with reference to FIG. 5.

The main characteristic of this method is the provision of a broadcast interruption signal line 502. A broadcast register group 503 corresponding to each MPA111 is installed inside the shared memory controller (SMA) 110. A broadcast data transmission source CPU102 writes the broadcast data onto a broadcast data register 504 by way of the shared memory buses 105, 106. When data is written onto the broadcast data register 504, that broadcast data is also written onto each MPA register group 503. Along with this data writing, each MPA broadcast interrupt signal output circuit 505 sends a signal to the broadcast interruption signal line 502 and an interrupt signal is sent to each CPU102 by way of each MPA111.

The CPU102 inside each CPU-PK reads the corresponding MPA broadcast register 503 written with the broadcast data. The data that is read out is stored in the broadcast register group 501 inside the corresponding MPA111. None of the other CPUs 102 contained in that CPU-PK view the broadcast data stored in the SMA, but they do view the broadcast data stored in the broadcast register group 501 inside the corresponding MPA111. In this method, it is sufficient if only one CPU102 inside the CPU-PK proceeds to read the MPA broadcast register group 503 so that the time used on the shared memory path can be decreased. The received data is stored at this time in the register of each CPU, and can be added by OR summing of the plurality of received broadcast data as a method of storing the data at this time.

Figure 6:
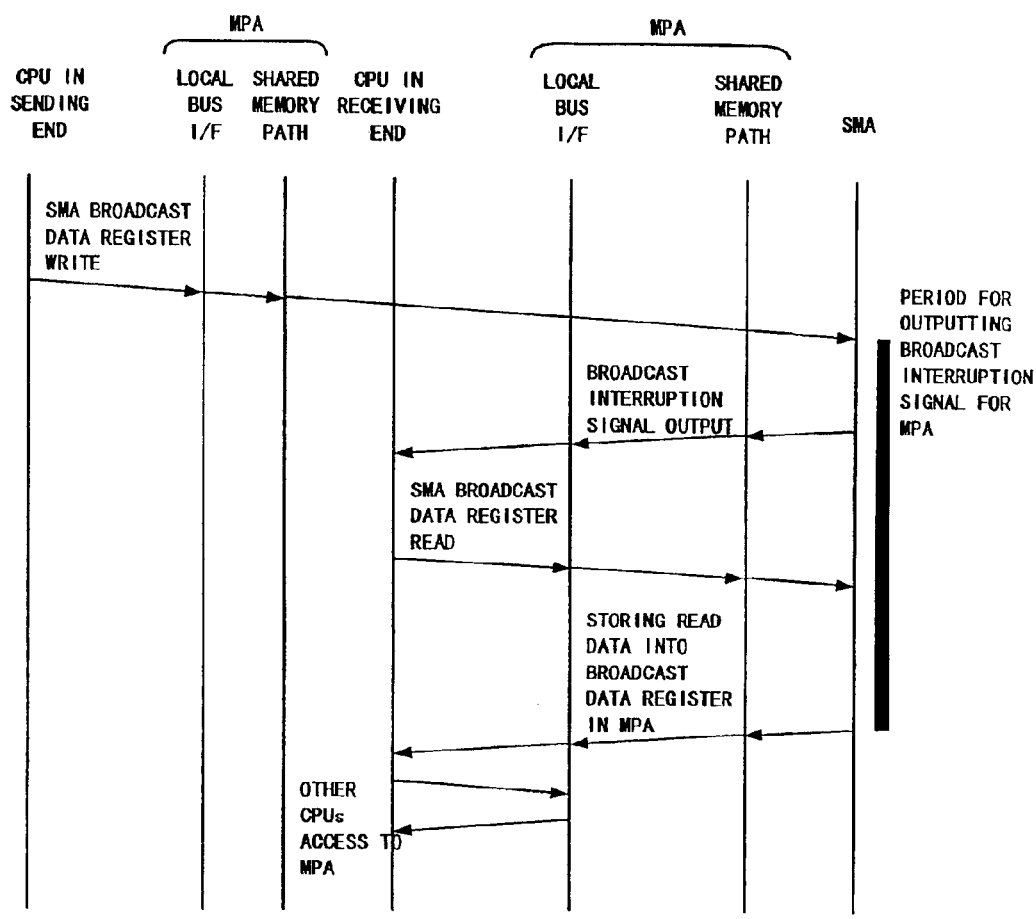
FIG. 6 is a diagram showing the data flow in the second broadcast method.

FIG. 6 is a diagram showing the data flow in this broadcast method for receiving data among the broadcast transmit source CPU and MPA, broadcast receive signal destination CPU, MPA, and the SMA. When one CPU 102 inside a CPU-PK101 reads the MPA broadcast register group 503 for the corresponding CPU on receiving a broadcast interruption signal, the remaining CPU102 in the CPU-PK101 read-accesses the broadcast register group 501 inside the MPA and the broadcast is completed. The period for output of the interruption signal is the interval from data write onto the broadcast data register up to the read-access of the CPU.

Figure 7:
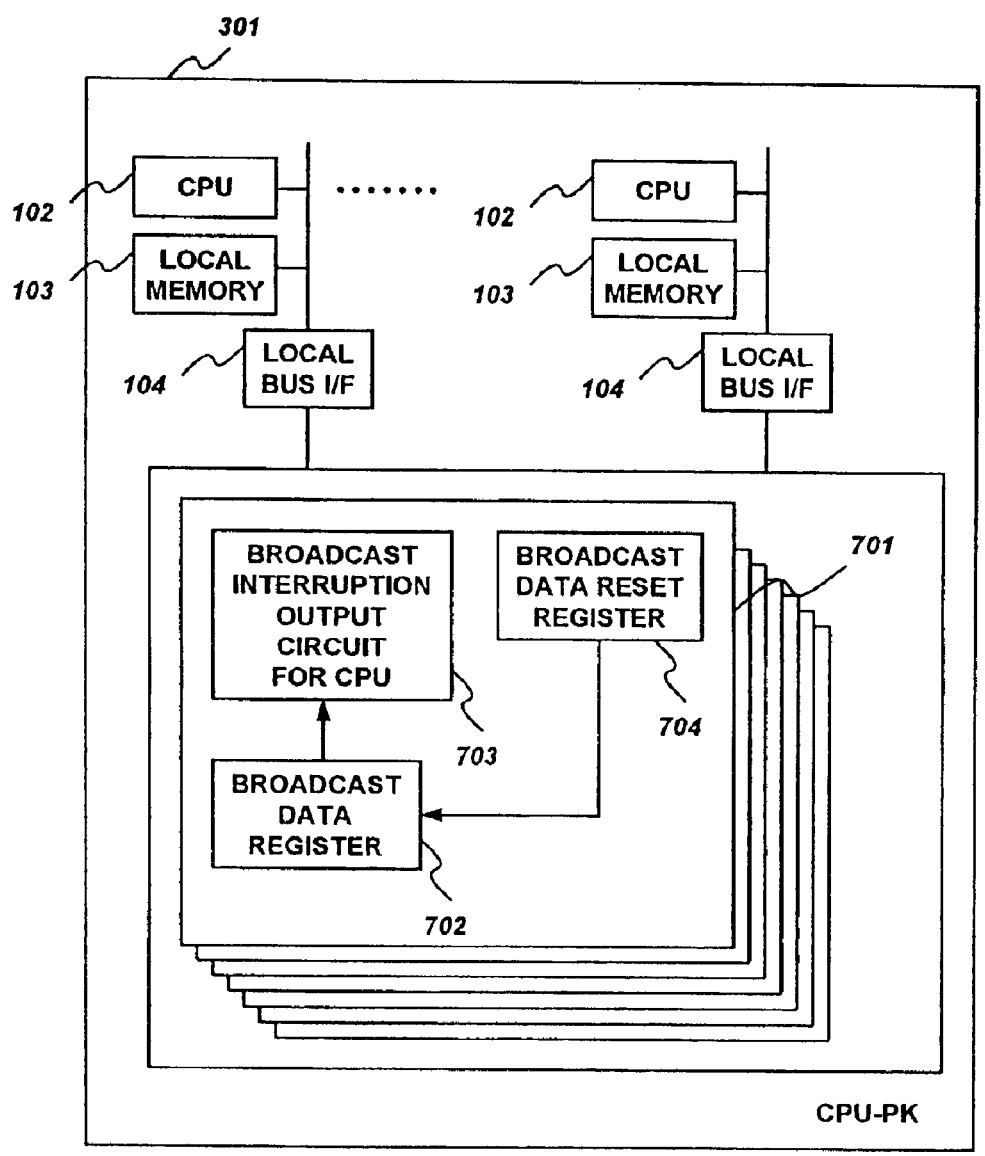
FIG. 7 is block diagram showing the structure of the CPU package.

FIG. 7 is block diagram showing the structure of the CPU-PK (package). A broadcast circuit 701 for each CPU102 is provided within its own package in the MPA111.

The broadcast data that was received in the MPA is stored in the broadcast data register 702. When data is stored in the broadcast data register 702, a broadcast interruption signal output circuit 703 transmits an interruption signal to each CPU within its own package. When the reading of broadcast data by each CPU is completed by the transmission of this interruption signal, the CPU resets the broadcast data by writing in the broadcast data reset register 704 and the output of the interruption signal stops.

(Third Method)

Figure 8:
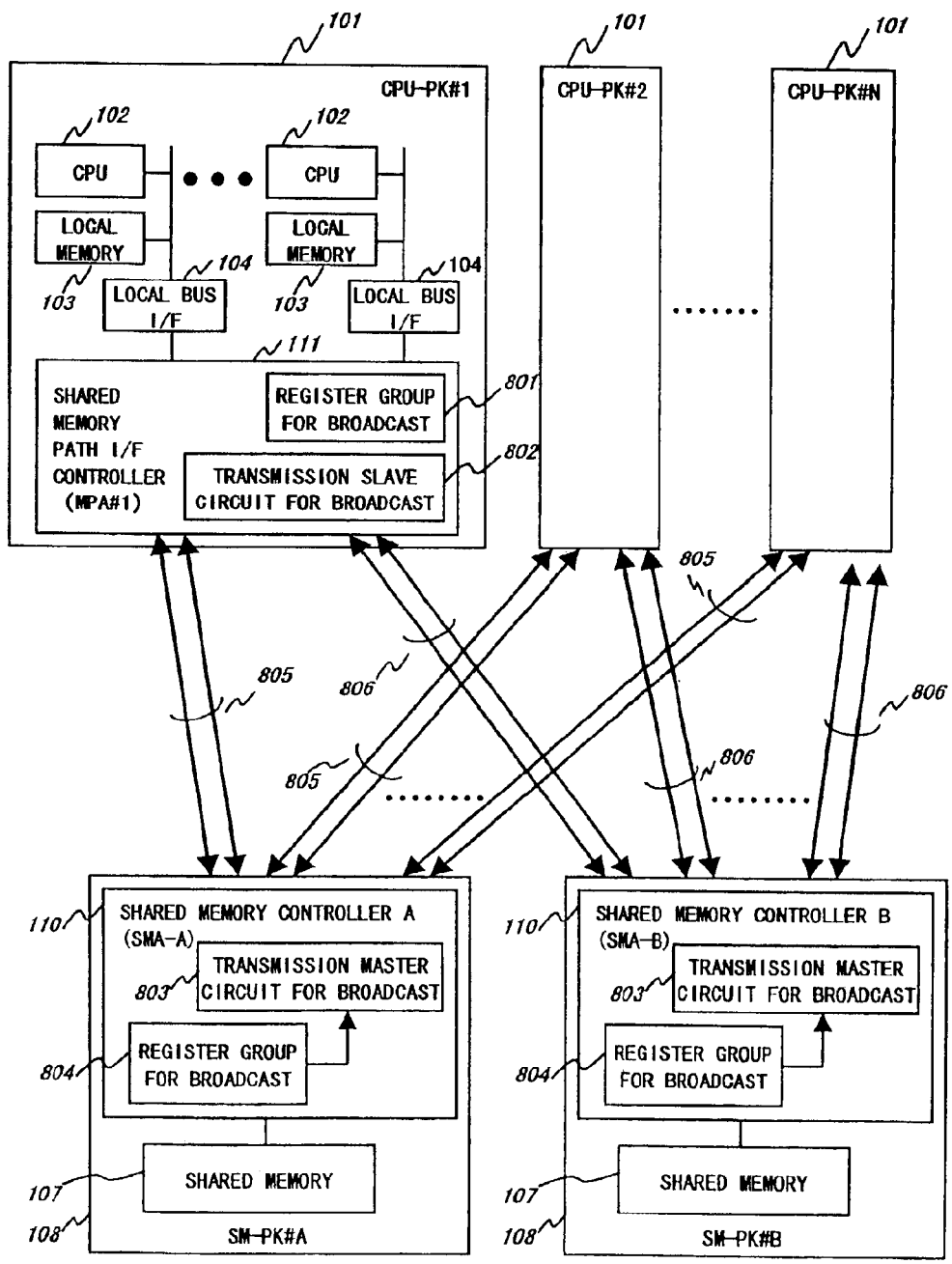
FIG. 8 is a block diagram illustrating the third broadcast method of this invention.

The third method will be described with reference to FIG. 8.

In this method, a broadcast register group 801, and a broadcast transmission slave circuit 802 are installed inside each MPA111. Also, a broadcast transmission master circuit 803, and a broadcast register group 804 are provided inside the SMA110.

When the broadcast data is written onto the broadcast register group 804, the broadcast transmission master circuit 803 transmits a write request for broadcast data to each MPA111 by way of the shared memories 805, 806. The broadcast transmission slave circuit 802 for each MPA111 receives the write request from the SMA110 and writes the received broadcast data onto the broadcast register group 801. A method which is the same as the above-described as the second method may be utilized for data transfer to each CPU102 from the MPA111.

Figure 9:
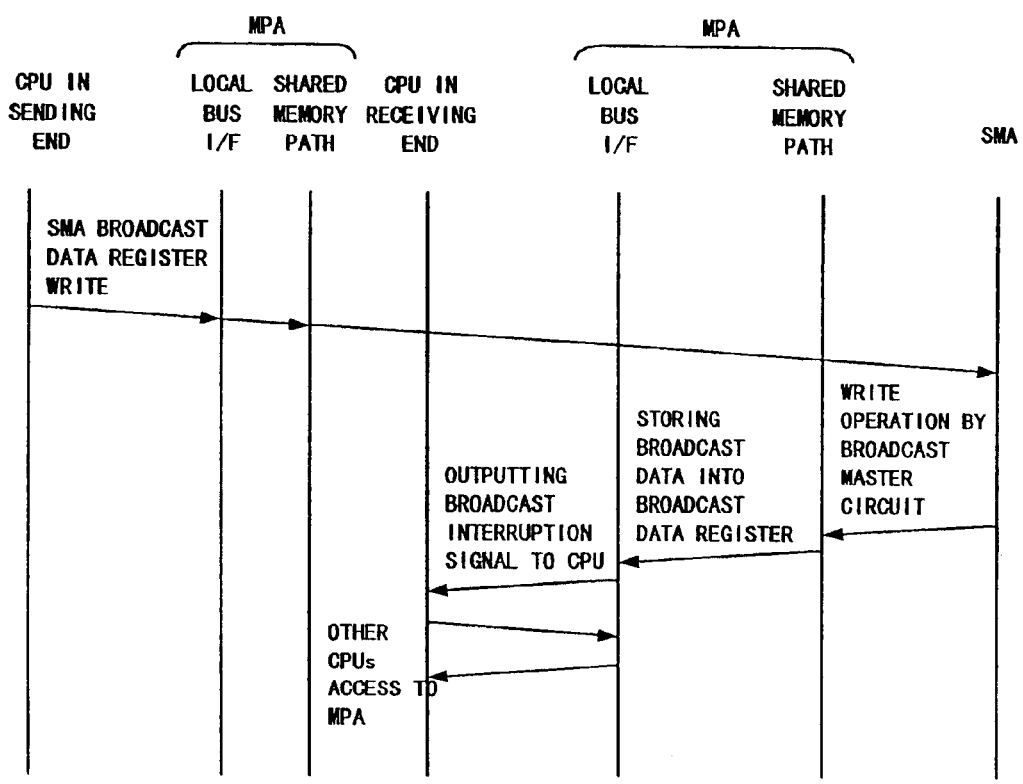
FIG. 9 is a diagram showing the data flow in the third broadcast method.

FIG. 9 is a diagram showing the flow of data exchange between the broadcast transmit source CPU and MPA, the broadcast receive destination CPU, MPA, and the SMA in this broadcast method. The SMA has a broadcast transmission master circuit 803 and writes broadcast data in the broadcast register group of each MPA, and each CPU receives broadcast data up to the access of the MPA111 inside its own CPU-PK. Therefore, just the same as in the second method, the usage rate of the shared memory buses 805, 806 can be reduced.

(Fourth Method)

Figure 10:
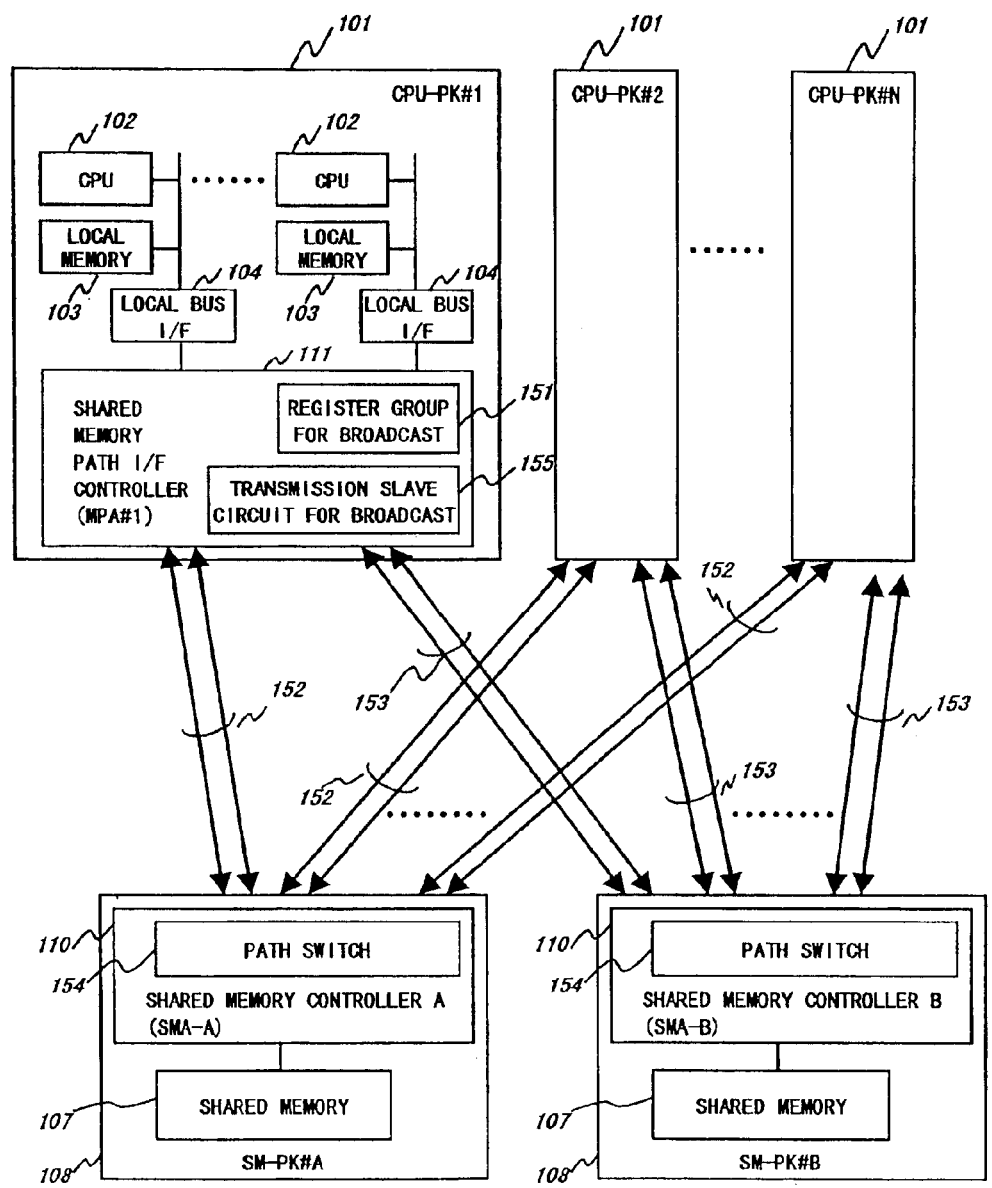
FIG. 10 is a block diagram illustrating the fourth broadcast method of this invention.

The fourth method will be described with reference to FIG. 10. In this method, a path switching device 154 is installed inside the SMA110 and a one-to-many connection status is established by this path switching device. The path switching device 154 detects a broadcast data transmit request from the MPA111, connects the shared memory buses 152 or 153 from the transmit request source, to other shared memory buses 152 or 153, and establishes a one-to-many transfer path status. Crossbar switches may be utilized for example as the path switching device 154. Equivalent components may also be utilized.

A broadcast transmit slave circuit 155 is installed in the MPA111 and writes the broadcast data received from another MPA in the broadcast register group 151. The transfer from the MPA to the CPU102 of its own CPU-PK may utilize a method the same method as described with reference to FIG. 7.

Figure 11:
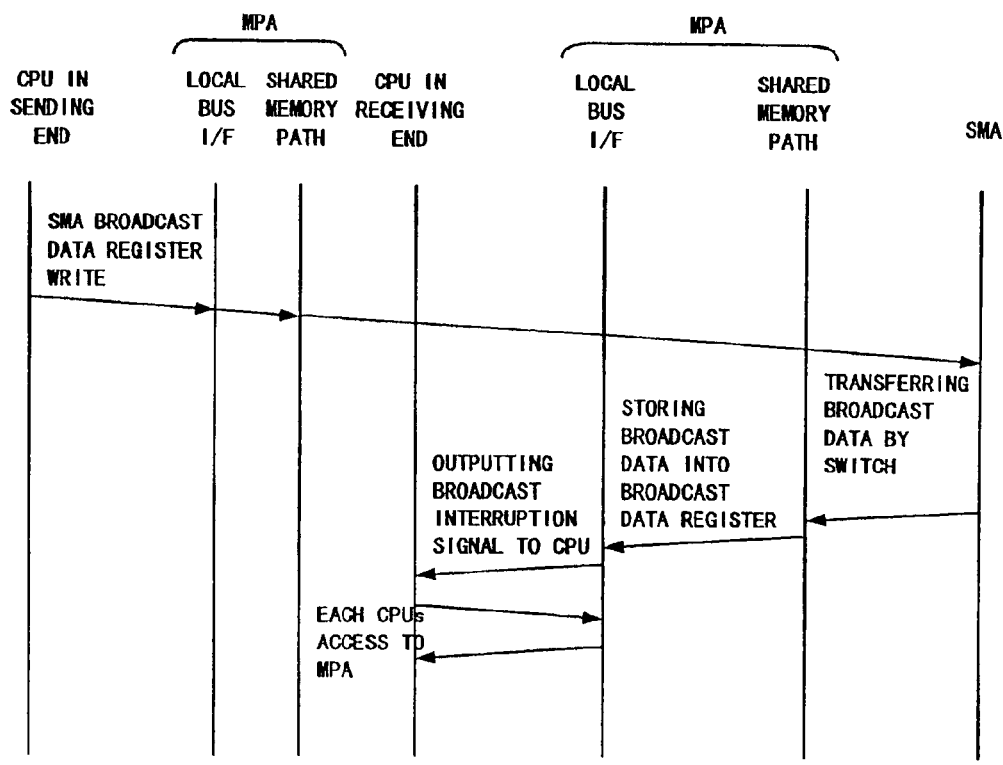
FIG. 11 is a diagram showing the data flow in the fourth broadcast method.

FIG. 11 is a diagram showing the flow of data exchange between the broadcast transmit source CPU and MPA, the broadcast receive destination CPU, MPA, and the SMA in the broadcast method for this method. By establishing a one-to-many physical connection the same as with the common path by means of the path switching device, the CPU participates in receiving broadcast data from the SMA and broadcast is possible without installing a master circuit for transmission into the SMA.

(Fifth Method)

Figure 12:
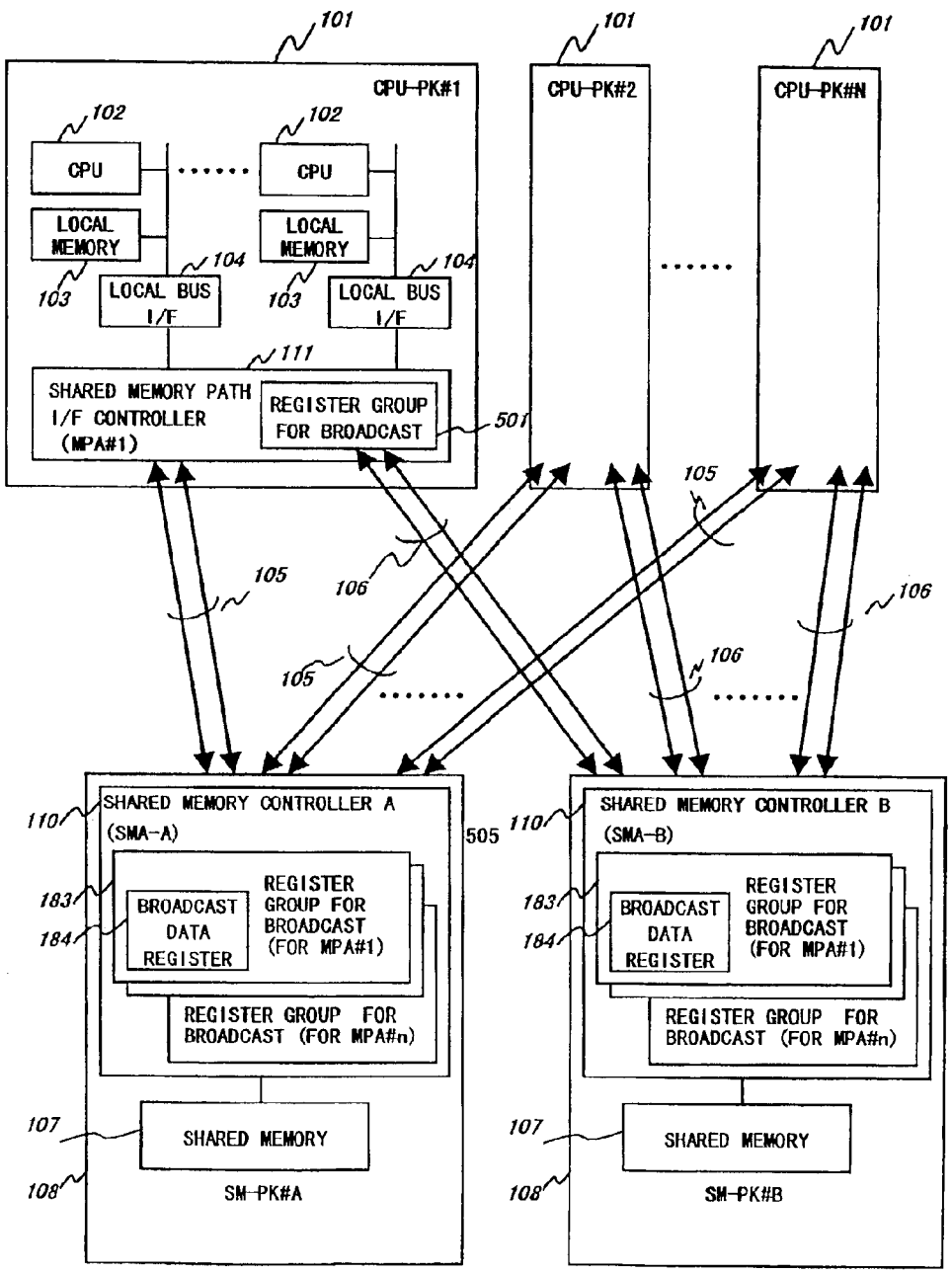
FIG. 12 is a block diagram illustrating the fifth broadcast method of this invention.

The fifth method will be described with reference to FIG. 12. A broadcast register group 181 is installed inside the MPA, and a broadcast register group 183 for each MPA is installed in the SMA. The CPU for the broadcast transmit source writes the broadcast data in the broadcast data register 184 inside the SMA. When the CPU for the broadcast transmit source writes the broadcast data into the broadcast data register 184 inside the SMA, that broadcast data is written in all the MPA broadcast data registers 183 within that SMA. Each CPU for other than the broadcast transmit source performs polling of each MPA broadcast data register 183, and each CPU writes the applicable data that was read out into the connected broadcast register group 181, and the broadcast is thus carried out.

Figure 13:
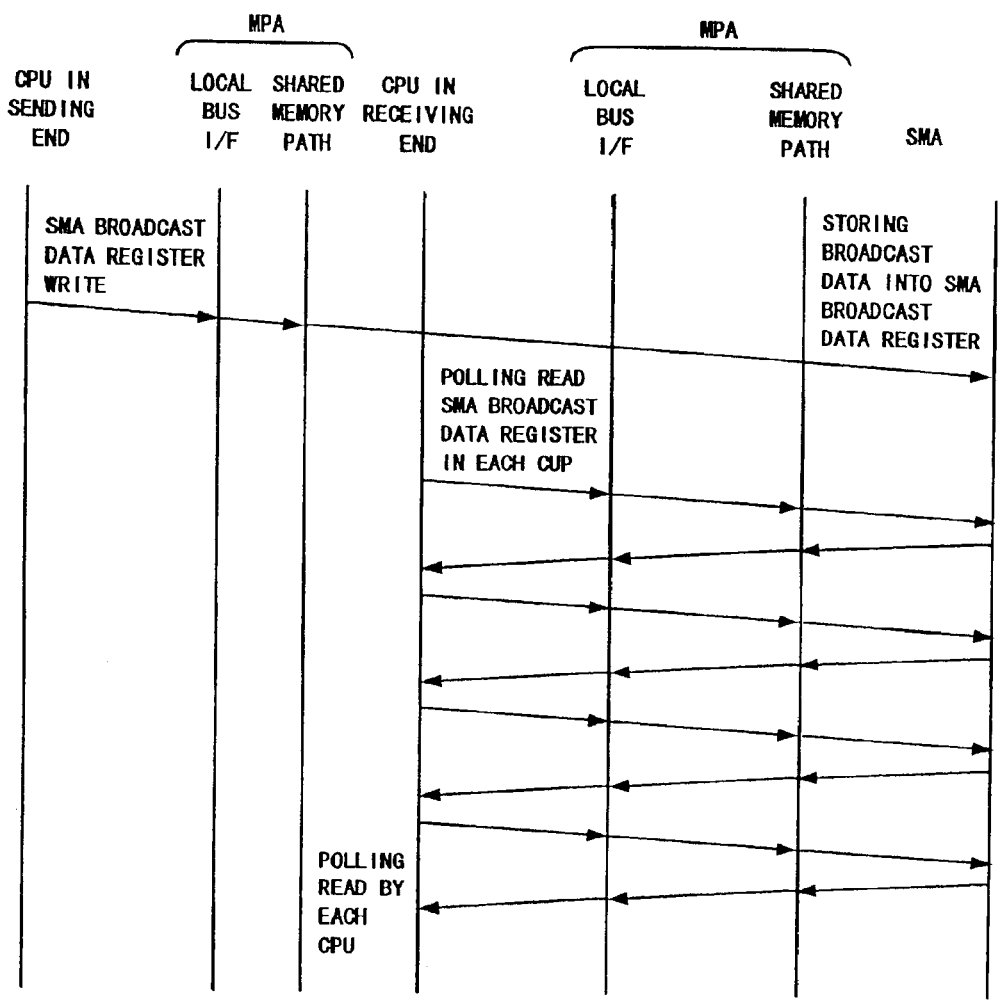
FIG. 13 is a diagram showing the data flow in the fifth broadcast method.

FIG. 13 is a diagram showing the flow of data exchange between the broadcast transmit source CPU and MPA, the broadcast receive destination CPU, MPA, and the SMA in the broadcast method for this method. Polling is performed only by one CPU102 inside the CPU-PK, the broadcast data is written in the broadcast register 181 inside that CPU-PK, and the other CPUs 102 inside that CPU-PK perform polling of the broadcast register 181 inside that CPU-PK so that the usage rate of the shared memory access paths may be reduced.

Therefore, in the invention as described above, a disk array controller connected in a star configuration between a shared memory and a plurality of processors that is capable of broadcasting can be provided.

What is claimed is:

1. A storage system comprising:
 a plurality of disk devices; and
 a disk controller,
 wherein said disk controller comprises:
 a plurality of interfaces including host computer interfaces which are connectable to host computers and disk device interfaces which are connectable to said plurality of disk devices,
 wherein each of said interfaces includes a plurality of processors,
 a broadcast register connected to said interfaces in a one-to-one ratio by respective access paths,
 a cache memory unit, and
 a selector,
 wherein said host computer interfaces and said disk device interfaces are connected via said selector to said cache memory unit,
 wherein said host computer interfaces and said disk device interfaces are directly connected to said broadcast register,
 wherein one of said processors of each of said interfaces transmits broadcast data to another one of said processors via said broadcast register.

2. A storage system according to claim 1, wherein said broadcast register transmits interruption signals to said interfaces when one of said processors writes broadcast data into said broadcast register by way of respective access paths, wherein upon receiving an interruption signal, one of said processors of each of said interfaces reads the broadcast data written in said broadcast register.

3. A storage system according to claim 2, wherein each of said interfaces has a memory, and
 wherein said one of said processors of each of said interfaces stores said broadcast data into said memory within said interface after reading said broadcast data from said broadcast register.

4. A storage system according to claim 3, wherein the number of access paths between said selector and said interfaces is larger than the number of access paths between said cache memory and said selector.

5. A storage system comprising:
 a plurality of disk devices; and
 a disk controller,
 wherein said disk controller comprises:
 a plurality of interfaces including host computer interfaces which are connectable to host computers and disk device interfaces which are connectable to said plurality of disk devices,
 wherein each of said interfaces respectively have a plurality of processors,
 a shared memory unit connected to said interfaces in a one-to-one ratio by respective access paths,
 a cache memory unit, and
 a switch,
 wherein said host computer interfaces and said disk device interfaces are connected via said switch to said cache memory unit,
 wherein said host interfaces and said disk device interfaces are directly connected via said switch to said shared memory unit,
 wherein one of said processors of each of said interfaces transmits broadcast data to another one of said processors via said shared memory unit.

6. A storage system comprising:
 a plurality of disk devices; and
 a disk controller,
 wherein said disk controller comprises:
 a plurality of host interfaces connectable to said disk devices,
 wherein each of said disk drive interfaces has a second processor,
 a shared memory unit connected to said host interfaces and said disk device interfaces in a one-to-one ratio by respective access paths,
 a cache memory unit,
 a first selector connected to said host interfaces and said cache memory, and
 a second selector connected to said disk device interfaces and said cache memory,
 wherein said host interfaces and said disk device interfaces are directly connected via said first and second selectors to said shared memory unit,
 wherein one of said first and second processors transmits broadcast data to another one of said first and second processors via said shared memory unit.

7. A storage system according to claim 6, wherein said shared memory unit transmits interruption signals to said host interfaces and said disk device interfaces when one of said first and second processors writes broadcast data into said shared memory unit by way of respective access paths, wherein upon receiving an interruption signal, one of said first and second processors reads the broadcast data written in said shared memory unit.

8. A storage system according to claim 7, wherein each of said host interfaces and disk device interfaces has a memory, and wherein said one of said first and second processors stores said broadcast data into said memory within said interface after reading said broadcast data from said shared memory unit.

9. A storage system according to claim 8, wherein the number of access paths between said first switch and said host interfaces is larger than the number of access paths between said cache memory and said first switch, and the number of access paths between said second switch and said disk device interfaces is larger than the number of access paths between said cache memory and said second switch.

10. A storage system comprising:

a plurality of disk devices; and a disk controller, wherein said disk controller comprises:

a plurality of host interfaces connectable to computers, wherein each of said host interfaces has a first processor, a plurality of disk device interfaces connectable to said disk devices, wherein each of said disk drive interfaces has a second processor, a switch connected to said host interfaces and said disk device interfaces in a one-to-one ratio by respective access paths, a cache memory unit, a first selector connected to said host interfaces and said cache memory, and a second selector connected to said disk device interfaces and said cache memory, wherein said host interfaces and said disk device interfaces are directly connected via said first and second selectors to said switch, wherein one of said first and second processors transmits broadcast data to another one of said first and second processors via said switch.

11. A storage system according to claim 10, further comprising a broadcast register connected to said switch, wherein said broadcast data are stored in said broadcast register.

* * * * *